W. H. FORD.
MOLDING APPARATUS.
APPLICATION FILED MAR. 19, 1910.
1,175,626.
Patented Mar. 14, 1916.
3 SHEETS—SHEET 1.
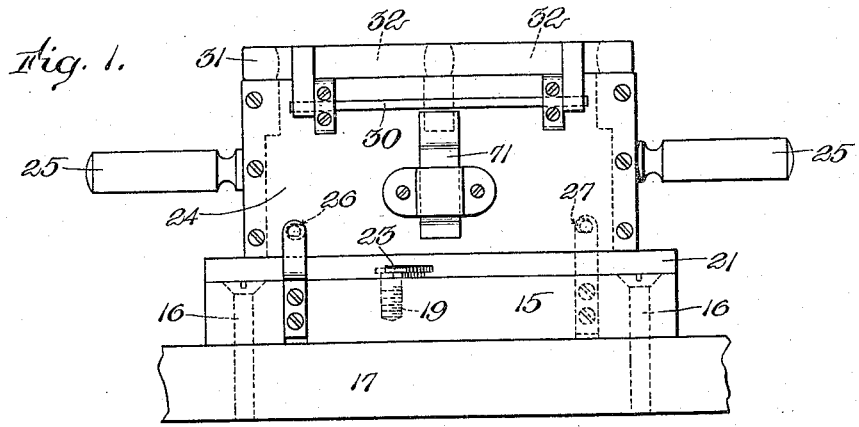
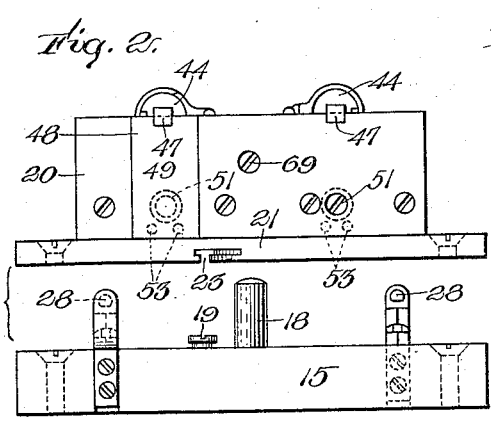
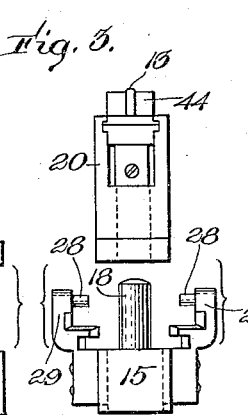
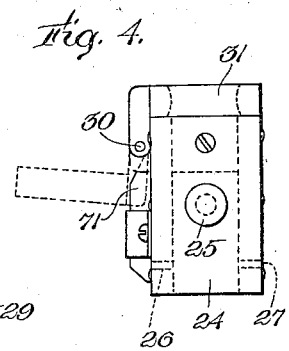
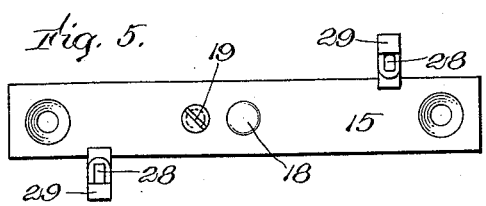
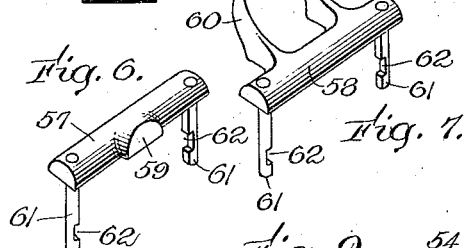
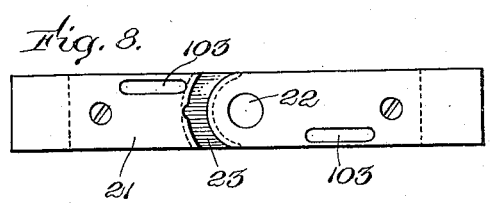
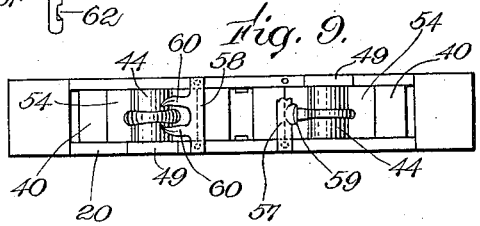
Witnesses:
Wm. J. Pike
Edward Maxwell
Inventor:
William H. Ford,
by Geo. H. Maxwell
Attorney.

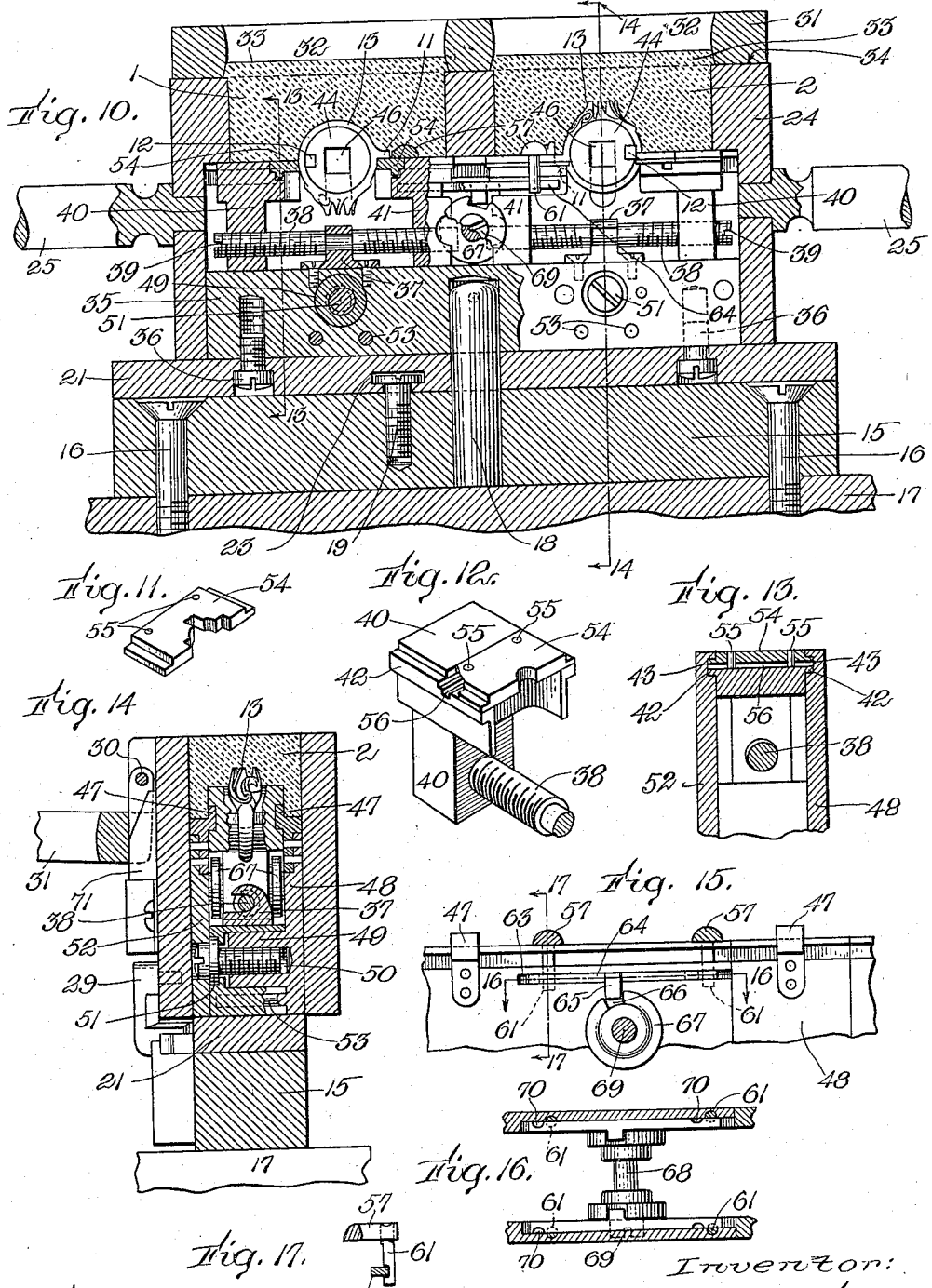

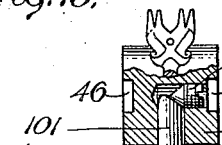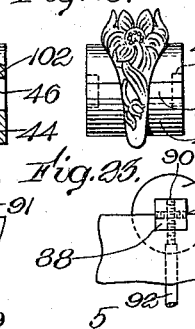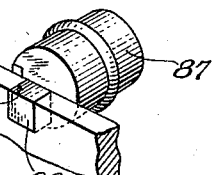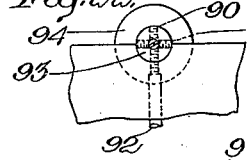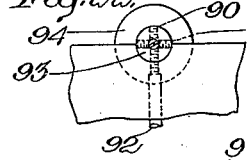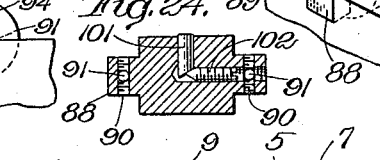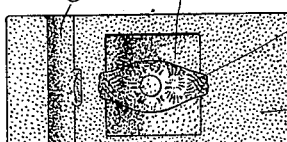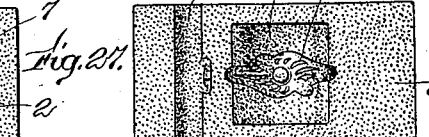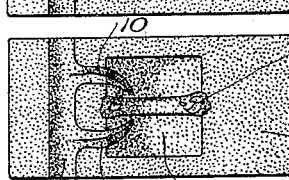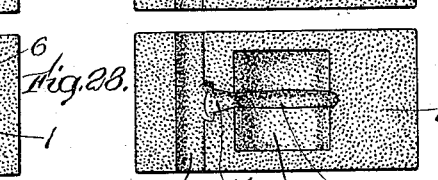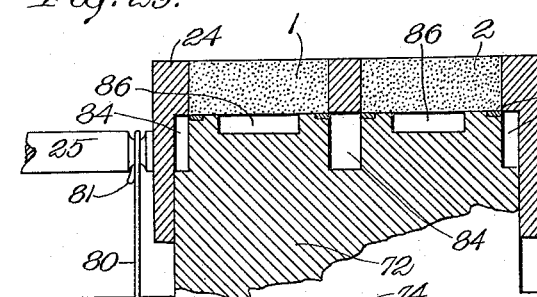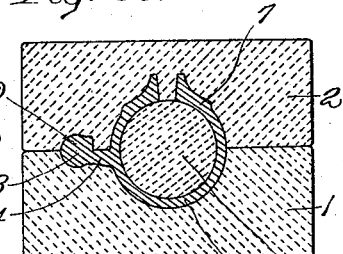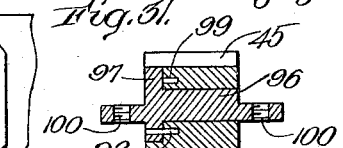

UNITED STATES PATENT OFFICE.

WILLIAM H. FORD, OF LOWELL, MASSACHUSETTS, ASSIGNOR OF ONE-HALF TO FRANK HANCHETT, OF LOWELL, MASSACHUSETTS.

MOLDING APPARATUS.

1,175,626.  Specification of Letters Patent.  Patented Mar. 14, 1916.

Application filed March 19, 1910. Serial No. 550,424.

*To all whom it may concern:*

Be it known that I, WILLIAM H. FORD, a citizen of the United States, and resident of Lowell, in the county of Middlesex and State of Massachusetts, have invented an Improvement in Molding Apparatus, of which the following description, in connection with the accompanying drawings, is a specification, like letters on the drawings representing like parts.

My invention relates to apparatus for preparing molds for casting operations.

For convenience of explanation and illustration, I have shown my invention applied to the preparation of molds for small articles, such for example as rings or the more delicate class of work, although it will be understood that it is not limited thereto.

Briefly stated, I provide a lower shaping or forming receptacle detachably connected with a base and adapted to receive a molding frame, which, after the pattern or patterns have been properly placed in the sand and given their shape to the latter, are separated and the molds extracted therefrom by means of a coöperating extracting mechanism.

In the accompanying drawings, in which I have shown various preferred embodiments and constructional details of one form of my invention, which, however, may obviously be embodied in a great variety of other forms, Figure 1 is a view in side elevation of the assembled frame, shaping or forming receptacle and base; Fig. 2 is a similar view of said parts with the frame removed and the parts slightly separated; Fig. 3 is an end view of the parts shown in Fig. 2; Fig. 4 is an end view of the inclosing frame; Fig. 5 is a top plan view of the base; Figs. 6 and 7 are perspective views of detachable runway-formers; Fig. 8 is a bottom plan view of the bottom of the shaping and forming receptacle; Fig. 9 is a top plan view of said receptacle; Fig. 10 is an enlarged central vertical longitudinal sectional view of the apparatus thus far referred to; Figs. 11 and 12 are perspective views of a portion of the adjusting mechanism thereof; Fig. 13 is a vertical transverse sectional view on the line 13—13, Fig. 10; Fig. 14 is a vertical transverse sectional view taken on the line 14—14, Fig. 10; Fig. 15 is a sectional view showing in fragmentary side elevation the far side of the shaping or forming receptacle, showing the adjusting means for locking the runway formers in place; Fig. 16 is a horizontal sectional view of said receptacle taken on the line 17—17, Fig. 15; Fig. 17 shows in fragmentary side elevation one end of the runway former, with the locking slide shown in section; Fig. 18 is a view in side elevation, parts being broken away, of an expansion core or hub; Figs. 19 and 20 are views in side and end elevation respectively of a plain core or hub; Fig. 21 is a perspective view showing a hub with a projecting end interlocked with the receptacle; Figs. 22 and 23 are fragmentary views in side elevation showing different ways of locking the hub in place; Fig. 24 is a transverse longitudinal sectional view of an expansion core or hub with projecting threaded ends; Figs. 25 and 26 are views respectively in bottom and top plan of the complemental halves of one complete copying mold without its sand core; Figs. 27 and 28 are similar views of a mold for a fixed pattern; Fig. 29 is a view in front elevation, partly broken away, showing the ejecting means for ejecting the mold from the molding frame; Fig. 30 is a central cross sectional view of an assembled mold including its sand core; Fig. 31 is a longitudinal sectional view of one form of core taken on the line 31—31, Fig. 32; Fig. 32 is a view of the mold shown in Fig. 31 looking toward the right; and Fig. 33 is a perspective view of a sand core.

Again bearing in mind that for the purpose of best explaining my invention, I have shown a complete embodiment thereof adapted to mold circular articles such as rings and more particularly such as finger rings, said particular embodiment, however, being for purposes of illustration and the invention not restricted in any way thereto, the apparatus will best be understood by mentioning at the beginning that the purpose of the apparatus is to form or shape a mold, the parts of one kind of which are shown in Figs. 25, 26, and 33, and of another kind in Figs. 27, 28, and 33, and in section in Fig. 30. In these figures, a bottom block or piece 1 of suitable material according to the kind and size of article to be cast therein, such as sand or any moldable material, is pressed, driven, molded, or otherwise shaped to coöperate with a complemental top block or piece 2. These two blocks, as herein shown, are provided with meeting surfaces, herein shown as flat or plane, and each block carries a complemental portion of the mold which is finally to determine the cast shape of the article, being, as herein shown, formed from half of the pattern this portion being used. In Figs. 25 and 26 a mold is shown for casting a finger ring by copying a ring from the finger (i. e. without a regular fixed pattern). In the first place a sand core 3, see Fig. 33, is provided corresponding to the internal diameter of the ring, and the mold blocks 1, 2 are provided with mold cavities or recesses 4, 5 which together correspond to the shape and size of the sand core 3. The impression of the ring itself in these recesses is indicated at 6, 7, half of the ring impression being shown in each block. A runway 8, 9 for the metal when it is poured is formed, half in one block and half in the other. In the case of copying a ring, as there is no runway-former on the ring itself, I provide in the bottom block 1 two lateral feeds or runways 10 leading from the main runway 8, 9 and having their inner ends tapered and caused to terminate at a very short distance from the narrow part or shank of the ring. I prefer to have these runway feeds 10 curve inwardly as shown in Fig. 26 and terminate short of the ring-impression in the manner stated, because thereby the apparatus is adapted to the varying widths and shapes of rings which are apt to be copied. The thin wall of sand or molded material of the mold which remains between the mold cavity 6 and the terminals of the feeds 10 is cut out or broken in by a point or tool in the hands of the workman. In Figs. 27 and 28, I have shown the same general kind of mold excepting that it is shown constructed to provide for the casting of rings from fixed patterns, the corresponding parts being designated by corresponding primed numerals. A fixed pattern differs from a regular ring in having a runway-former 11, and a transverse positioning tongue 12, as clearly shown in Fig. 20, where one form of fixed pattern 13 is shown. This runway-former, therefore, itself makes a regular runway or feed entrance 14 from the main runway 8, and 9 into the mold groove or cavity 6 of the shank portion of the ring, the molds being otherwise the same as described in connection with Figs. 25 and 26. Having made the mold, it is assembled as shown in Fig. 30, from which it will readily be understood that when the molten metal is run into the runway 8, 9 it flows through the branch runway or mold entrance 14 into the ring cavity 6, 7 and thereby casts the ring.

Turning now to the apparatus which makes this mold, it will be seen that I have provided a base 15 adapted to be secured by screws 16 to a bench or other support 17 and provided with an upwardly projecting pivot pin 18 and headed stud 19. Adapted to be removably secured upon this base 15 is a shaping or forming receptacle 20 whose bottom plate 21 is provided with a hole 22 to fit down over the pivot pin 18, and with a concentric T-shaped slot 23 to receive the flanged head of stud 19 for locking the parts together when the receptacle 20 is placed down over the pin 18 at an oblique angle thereto and then turned on said pivot so as to cause the flanged stud 19 to slide into the undercut or T-shaped groove 23. Removably fitting snugly over the receptacle 20 onto its bottom 21, which projects laterally to constitute a receiving flange therefor, is a rectangular frame 24 provided at its ends with handles 25 and at one side adjacent one end with a hole 26 and adjacent its other side and end with a hole 27. The receptacle 20 and frame 24 may assume various shapes, but in the present embodiment they are shown as oblong and rectangular, the frame 24 having a close slidable fit over the receptacle. Thus when this frame is set down over the forming receptacle 20 and the latter is put on the base pivot 18 and swung around into alinement with the base, all the parts are locked together by the flanged head 19 fitting the groove 23 and by horizontal pins 28 carried by the upright ends 29 of brackets secured to the base in position to cause said pins 28 to enter the holes 26, 27 of the frame when the parts are swung around into alinement as stated. The brackets 29 act also as stops to halt the swinging movement when the parts have come into true alinement. Pivoted at 30 to the back of the frame 24 is a top sand box or filler 31 provided with openings 32, as best shown in Fig. 10, through which the sand or other material which is to constitute the mold is poured and packed, pressed, or driven down hard. This top 31 is hinged so that it can be turned back as shown in Fig. 4 to permit the operator to cut off with a knife or leveling tool the surplus 33 of the sand or other material used, absolutely level with the top edge 34 of the frame. I consider it quite essential to have all of the half-molds exactly the same size externally, so that when the two halves are together all the assembled molds will have exactly the same external dimensions, so that they can be kept stacked one on top of another and gated to be all cast at one pouring.

The mechanism of the shaping and forming receptacle by means of which the ring being copied, or other pattern, is automatically positioned with absolute precision to receive the sand or other mold-making material, is best shown in Figs. 2, 3, 6, 7, 9–24. In the embodiment of my invention herein shown, I provide the shaping or forming receptacle 20 with two cavities so as to form the two halves 1 and 2 of the complete mold at the same time, and accordingly in the bottom of the receptacle I provide a block or heavy plate 35 which is secured to the bottom 21 by screws 36, and on this plate I secure longitudinally apertured lugs 37 in which are mounted right and left hand threaded screws 38 provided with slotted ends 39 to receive a screwdriver for turning them (when the surrounding frame 24 is removed from said surrounding position, Fig. 10). The opposite ends of these screws carry slide blocks or members 40, 41. These blocks are provided at their upper ends with guide ledges 42 for longitudinal guided movement in a corresponding groove 43, in the sides of the receptacle. These blocks or members 40, 41 constitute movable floors or closing devices to close against the core and pattern and stop the opening which would otherwise exist, so as to give a true level bottom to the mold tight against the pattern and pattern core, and thereby produce in the resulting mold the desired true level or plane surface as shown in Fig. 30. The pattern 13 is supported in position by a pattern core, one form thereof being indicated at 44. This pattern core is exactly the same size and circumferential shape as the sand core 3 excepting that it has a longitudinal groove 45 in one side to receive the positioning tongue 12 of the pattern 13. In each end, this pattern core 44 is provided with a rectangular recess 46, by means of which it is accurately centered and positioned in the machine. To accomplish this positioning of the core, in one embodiment of my invention, I provide rectangular bosses or inwardly extending projections 47, Figs. 14 and 15, one of which is mounted on a movable portion 48 of the wall of the shaping and forming device, see Figs. 2, 14, 15. This movable wall, on its inner face, is provided with an inwardly extending, preferably integral, boss 49 threaded to receive the threaded end of an operating screw 50 whose shouldered head is rotatably held in the groove 51 provided in a sleeve which extends inwardly from the opposite stationary portion 52 of the receptacle, said sleeve receiving and guiding the boss 49, and said movable part 48 being further guided by having pins 53 entering guide holes in the opposite stationary part. Thus by turning the screw 50 in one direction, the frame 24 being moved out of the way the movable part 48 and its centering projection 47 will be moved outwardly, thereby separating the two projections 47 sufficiently to receive between them the pattern core or hub 44. The adjacent recess 46 of said hub is then fitted over one of the projections 47 and the screw is turned in the opposite direction so as to bring the movable part 48 back again into proper alinement with its side of the receptacle, said movement causing the core to be clamped firmly in accurately centered position with the two projections 47 fitting into the recesses 46 thereof, and as these coöperating parts are angular in shape, the result is that the core is now not only positioned correctly longitudinally but in every other way. As soon as the core is in place, the right and left threaded screw 38 is turned so as to bring the stop floors or ends of the movable slides up tightly against the core and pattern. To accommodate the apparatus to all varieties of shape and size of ring pattern and pattern cores or hubs, I make the engaging edge portion 54 of the stop floors or members detachable so that an edge portion with any required engaging configuration may be put in place in accordance with the requirements of the pattern and pattern core. This is best shown in Figs. 10–13, where it will be seen that the removable part 54 (of Fig. 11 or the similar part 54' of Fig. 12) is provided with two depending pins 55 at its rear edge to travel in a transverse slot 56 provided in the adjacent part 40 or 41 as the case may be, said part 54 having at its opposite edges flanges which unite with the adjacent parts 42 to travel in the grooves 43. Thus the removable part 54 when in place in the stop portion 40, 41, and the latter in position in the machine, is held immovably with relation to said part 40, 41 so that it is compelled to move therewith. Suitably shaped runway-formers 57 are provided, the regulation kind thereof being shown in Fig. 6, and a different kind 58 being shown in Fig. 7. The former 57 has a stub or boss 59 at one side to coöperate with the projection 11 of the fixed pattern 13 when the latter is used, and the former 58 being provided with horn-like members 60 to make the kind of pattern shown in Fig. 26 when a ring is being copied. These formers are provided with depending posts 61 having notches 62 in their inner sides, said posts fitting in positioning holes provided therefor in the sides of the receptacle so that the notches 62 come in alinement with a slot 63 on the inner side of the adjacent wall of the receptacle, in which moves a locking slide or bar 64 whose depending lug 65 engages in a notch 66 in a flange 67, see Figs. 15 and 16, of a transverse rotary member 68 having a notched head 69 externally accessible, Fig. 2, to a screw-driver, so that by rocking the member 68, the slide 64 is caused to lock and unlock the runway-formers, preferably both at the same time, so as to hold them firmly in place while the mold is being made and permit the substitution of one kind or another according to the requirements of a given pattern. The slides are provided with notches 70, as best shown in Fig. 16, to permit the withdrawal of the legs or posts 61 of the runway-formers when the latter are to be removed.

The mechanism thus far described having been adjusted as shown in Fig. 10, the sand or other material for the mold is poured through the openings 32 and then rammed or driven down hard, and then the cover is thrown back to the position shown in Fig. 4, a rubber or other yielding buffer 71 being provided to prevent undue shock in turning back the cover so as not to mar or disfigure or otherwise disturb the stand or the mechanism of the frame. Then the operator takes his knife or other tool and cuts along the top edge 34 of the receptacle 24, thereby cutting off the surplus material 33 from the mold and leaving the latter with a plane sharp bottom or level surface. While the mold-shaping operation is taking place, the pins 28 hold the parts immovably together so that no displacement of any kind whatever by the jar of the pounding can possibly occur, such as raising of the frame or movement of the shaping receptacle. Having shaped the mold and cut off its bottom flat, the operator grasps the handles 25 so as to turn the receptacle and frame on the pivot 18 sufficiently to disengage the pins 28 from the frame, and then lifts upwardly on the frame while the receptacle is still held to the base 15 by the coöperating lug 19 and T-groove 23. Thus the mold, carried by the frame, is lifted entirely free from the pattern and shaping receptacle by an absolutely straight-up movement without any possibility whatever of end or side shake or movement to break or disturb the delicate portions of the molded cavity such as the tip portions of the ring-clamps. Having thus removed the two halves of the mold, which are now supported in the frame, the frame is now set down over a mold-extractor, herein shown, Fig. 29, as comprising a plunger-like upper end 72 provided with a thumb screw or stud 73 for sliding into a slot 74 and clamping said plunger immovably to a receiving pocket or strap 75 secured to the bench 17. A rock shaft 76 is journaled in brackets or offsets 77 just below the strap 75 and is provided with forwardly projecting arms 78 in which is pivoted the central portion of a U-shaped wire or member 79 whose ends 80 are provided with hooks 81 to engage the handles 25 of the frame, being normally held forward toward the bench and hence in position to engage said handles by a spring 82. Accordingly, when the operator has placed the frame 24 and its mold parts 1, 2 as shown in Fig. 29, he depresses the rock shaft handle 83, which draws down powerfully on the wire ends 80 and hence on the handles 25 of the frame, causing the mold parts 1 and 2 to be accurately ejected or extracted by a true straight-up movement of the frame relative thereto. Preferably the plunger 72 is cut away at 84 so as to limit the downward movement of the frame and also to provide reduced portions to follow behind the mold parts 1, 2 and thereby carry them entirely out of the frame. Preferably a metal band or plate 85 is set into the edge of the upper ends of the reduced parts of the plunger so as to insure durability and maintain a level plane at the corner for lifting accurately the extreme corner or edge of the mold. Also preferably a cavity 86 is provided, sufficient in area to extend over the width of the core and length of the pattern so as to prevent any possibility of interfering with the mold at these points. When my invention is adapted to the requirements of extremely fine work, such as jewelers' work, I make the extractor of extremely hard material, such as indurated fiber, that will not scratch the frame, which is made of metal.

In Fig. 21, I have shown a pattern core 87, which, instead of having a recess as at 46, Figs. 18-20, is provided with a projection 88, in which case the adjacent side of the frame is provided with a notch 89 for properly positioning the pattern core in substantially the same way as previously described in connection with the coöperating constructions 46, 47. In Figs. 23 and 24, I have shown similar projections 88 provided with transverse threaded openings 90, 91 for receiving the threaded upper end of a long screw 92 extending up through the adjacent side of the shaping or forming receptacle, and in Fig. 22 the same threaded arrangement is provided in a circular projection 93 from the end of the pattern core 94. In Figs. 31 and 32, I have shown a still further modification of the pattern core, in which said core is shown as a shell 95 properly recessed to receive a removable carrier 96 having a head 97 at one end provided with a pin 98 for entering any one of four holes 99 in the shell. The carrier 96 is flattened at its ends and provided with transversely threaded openings 100 whereby it may be supported by screws 92 the same as shown in Figs. 22, 23. The reason for providing means for changing the rotary position of the pattern core as shown in all the forms thereof herein presented, is in order to permit the core and its pattern to be properly positioned in accordance with whatever style of ring is being molded. For instance, one ring may have the engraving or relief configuration directly on top (such as a stone ring), another slightly at one side (as a signet ring), etc. When a ring is to be copied, i. e. when the mold is to be made, not with reference to a fixed pattern such as shown in Fig. 20, but with reference to a regular finished ring, it is necessary to provide means for tightening the ring in place on the core, and accordingly I have shown such means in Figs. 18 and 24, consisting of a tightening plunger or lock 101 reciprocable radially in the pattern core, being herein shown as moved outwardly by the wedging action of a conical-ended screw actuator 102. Preferably slots 103 are provided in the base to permit the escape therethrough of sand accidentally dropped in the mechanism of the receptacle when the removable parts 48 of the sides of the receptacle are being operated by the insertion and removal of the core. Sometimes small particles of sand are left on the core or in the pattern or inside of the receptacle, and when the side 48 is opened, these particles will fall, and hence the openings 103 are provided to permit them to escape.

Having described my invention, what I claim as new, and desire to secure by Letters Patent is:

1. Molding apparatus, comprising a pattern holder, a frame fitting over said holder and having a recess above the pattern for receiving the mold material to be packed therein in impression-receiving relation to the pattern, said frame being removable with the packed mold material from the pattern holder, and a stationary mold-extractor shaped to fit within said frame and provided with means for engaging the bottom of the mold material outside of the pattern impression for ejecting the packed mold material when the frame is forced over said extractor.

2. In molding apparatus, a shaping or forming receptacle, having a laterally movable side, means to move said side out and in, and a pattern core adapted to receive a pattern and provided with means coöperating with said side for removably locking the core in position when the side is in.

3. In molding apparatus, a shaping or forming receptacle, a pattern core removably mounted in said receptacle and adapted to receive a pattern, floor-stop means to close horizontally against the pattern and pattern core, and means for moving said floor stop toward and from closing position.

4. In molding apparatus, a shaping or forming receptacle, a pattern core removably mounted in said receptacle and adapted to receive a pattern, opposite floor stops to close against the pattern and pattern core on their opposite sides, and means to move said floor stops simultaneously toward and from closing position.

5. In molding apparatus, a shaping or forming receptacle, a pattern core removably mounted therein for receiving a pattern, and a floor stop to close against the pattern and core, provided with a removable engaging edge.

6. In molding apparatus, a shaping or forming receptacle, a pattern core mounted therein for receiving a pattern, and a runway former removably mounted in said receptacle to coöperate with the pattern.

7. In molding apparatus, a pattern core, and means mounted therein for clamping a pattern immovably thereto, including a radially movable plunger and an adjustable wedge device to wedge said plunger outwardly.

8. In molding apparatus, a pattern core, having a longitudinal positioning groove in one side, combined with a pattern provided with a positioning tongue to fit said groove.

9. In molding apparatus, a pattern core, and a holder therefor, provided with coöperating means for maintaining the pattern core in a predetermined unvarying position when in mutual engagement, said coöperating means affording a range of at least two definite positions of the core in the holder.

10. In molding apparatus, a molding frame, a cover pivoted thereto, provided with openings through which the mold material may be packed, and a yielding buffer to take the jar of said cover when it is swung open on its pivot.

11. An apparatus of the character described having, in combination, a base, a cylindrical core print former mounted on said base, a ring applied to said core print former, a keyway extending longitudinally of said core print former and a key in said keyway adapted to lock said ring to said core print former.

12. An apparatus of the character described having, in combination, a base, a cylindrical core print former mounted on said base, a ring applied to said core print former and a stop plate slidable on said base, transversely of said core print former, and adapted to engage said core print former and said ring.

13. An apparatus of the character described, having, in combination, a base, a cylindrical core print former, mounted on said base, a ring applied to said core print former and stop plates on opposite sides of said core print former, respectively, said stop plates being slidable on said base, transversely of said core print former, and adapted to engage opposite sides of said core print former and ring.

14. An apparatus of the character desscribed having, in combination, a base, a cylindrical core print former mounted on said base, a ring applied to said core print former and a stop plate slidable on said base, transversely of said core print former, and adapted to engage said core print former and ring, and a rib on the upper face of said plate extending from said ring to the outer face of said base.

In testimony whereof, I have signed my name to this specification, in the presence of two subscribing witnesses.

WILLIAM H. FORD.

Witnesses:
M. J. SPALDING,
EDWARD MAXWELL.

Copies of this patent may be obtained for five cents each, by addressing the "Commissioner of Patents, Washington, D. C."